Patented Mar. 26, 1935

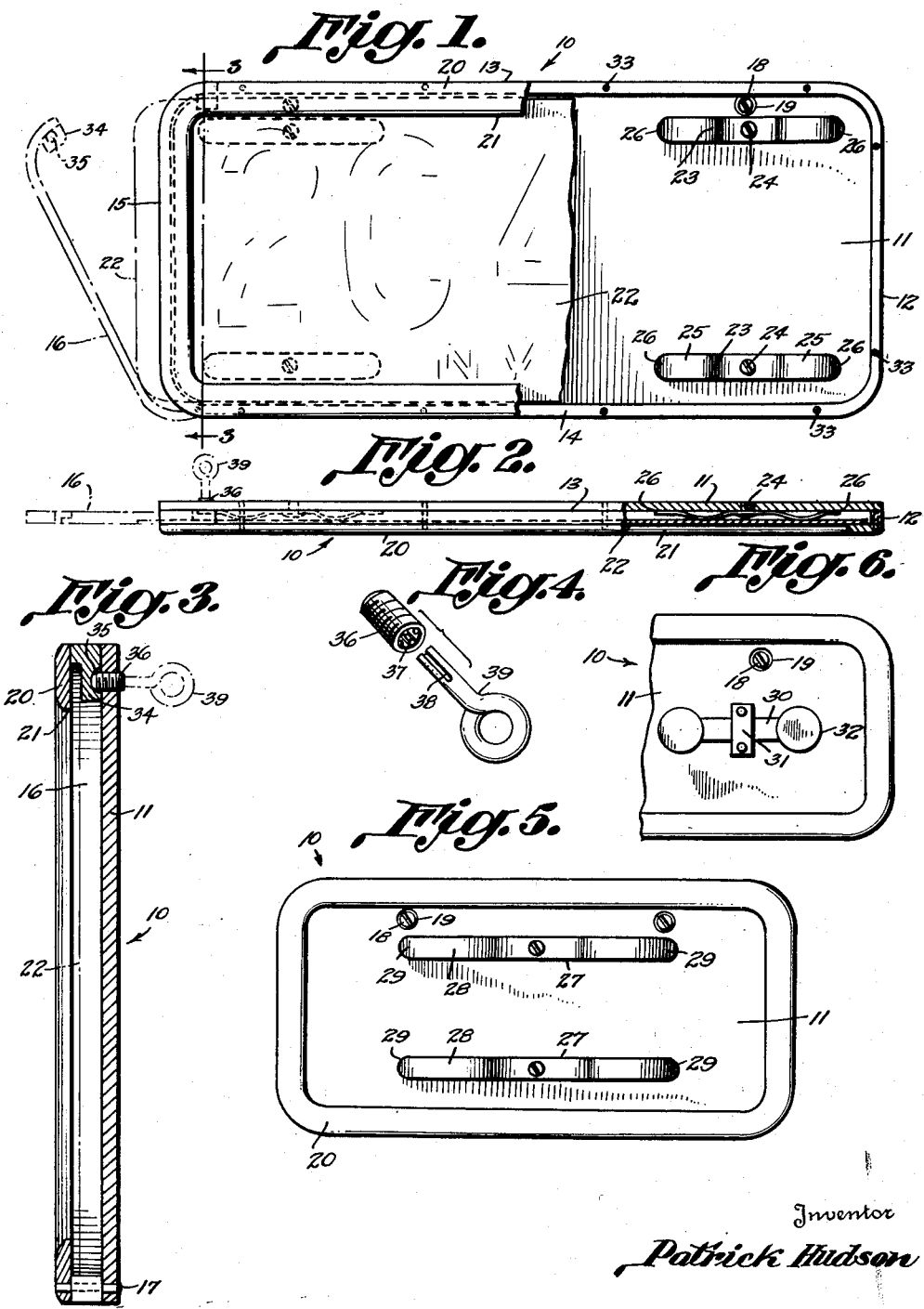

1,995,984

UNITED STATES PATENT OFFICE 1,995,984

SELF-HOLDING AUTO LICENSE FRAME

Patrick Hudson, New York, N. Y.

Application October 7, 1932, Serial No. 636,730

2 Claims. (Cl. 40—125)

This invention relates to a self-holding auto license frame and has for an object to provide an improved license holder for automobiles, trucks or other vehicles, wherein the law requires identification tags, or license plates.

A further object of this invention is to provide an improved license plate frame or holder, which frame or holder is to be permanently attached to the automobile or vehicle, being either added to the vehicle by the vehicle owner or supplied additionally by the automobile manufacturer.

A further object of this invention is to provide a license plate holder wherein it is unnecessary to use any bolts or nuts or other temporary attaching means, and wherein it is only necessary to insert the license plate into the frame to have it firmly and securely held in position therein, and at the same time wherein it will not be liable to rattle or to become lost in use.

Still a further object of this invention is to provide a license plate holder wherein the license plate may be easily inserted without tools and when in position will present a neat appearance.

Yet a further object of this invention is to provide a license plate holder wherein a spring means serves to hold the license plate firmly in position and wherein the spring means is such as to permit the license plate to be easily inserted in the holder without any possibility of the plate jamming against the spring and prevent it from entering the holder.

Another object of this invention is to provide a license plate holder which is in the shape of a box and wherein a closure member is provided at the end of the box to admit the license plate, the closure member being hinged and an improved means being provided for locking the free end of the hinged closure member firmly in position.

This application is a continuation in part of an application for a Self-holding auto license frame, filed January 19th, 1932, Serial No. 587,576, patented April 25, 1933, No. 1,905,874.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a side elevation of the license holder, the license and the front plate of the holder being broken away to show the springs attached to said holder. The dotted position of the locking member shows the license plate being removed from said holder, Figure 2 is a plan view of same showing the springs holding the license plate rigid and also showing the locking key in dotted lines after releasing the locking bar which is also shown in dotted lines, Figure 3 is an enlarged sectional view taken on line 3—3 of Figure 1 showing clearly how the set screw fits into the locking bar thereby locking the same, the license plate being shown in dotted lines, Figure 4 is a perspective view of the locking set screw and the key for turning the same showing clearly the internal splines in said set screw, Figure 5 is a modification showing two large springs instead of four small springs, as shown in Figure 1, and Figure 6 is a modification showing the bent spring member having rubber caps on either end of said spring.

There is shown at 10 the holder, which it will be observed is in the form of a box having a back 11, a closed end 12, a similar closed top 13 and bottom 14, and an open end 15, the open end 15 having a door 16 hinged thereto at 17. A plurality of bolts 18 are countersunk as at 19 through the back 11 to provide a means for securing this license plate holder to the automobile or vehicle.

A front wall 20 is formed in the box like holder 10, this wall 20 however having an opening 21 therein, the opening 21 being slightly smaller than the size of the license plate 22 that is to be placed therein. As will be observed, the recessed wall 20 forms in effect a frame through which the license plate 22 is visible and against which it is held by means of a plurality of spring members 23. The spring members 23 are secured to the back 11 by means of screws 24 passing centrally therethrough. In outline the spring members 23 are shaped like a somewhat flattened capital W, as will be clearly seen from Figure 2, wherein the screw 24 passes through the flat and center portion or upper apex of the W, the lower points or apices 25 of the W pressing against the back of the license plate 22 and the tips or wings 26 of the W pressing against the back 11 of the holder 10. The lower points 25 of the W are not sharp as in the letter, but are smoothly curved, as shown, thereby permitting the license plate 22 to slide into the holder 10 and to be held firmly against the frame 21 by being of a portion 25 of the spring 23.

In the form shown in Figures 1 and 2, the W spring 23 is somewhat short and four of these are provided one adjacent each corner of the holder 10. In the form shown in Figure 5, the W springs 27 are somewhat longer than the form shown in Figure 1 and only two W springs 27 are provided, the W springs 27 being located above and below the center of the back 11, thereby placing the license plate contact apices 28 substantially equidistant about the back 11, while the wings 29 press against the back 11 in the same manner as the wings 26 of the form shown in Figure 1. Instead of the wings being W-shaped as in the forms just described, they may be in the form of a bent substantially V-shaped leaf spring 30, which may be held to the back 11 by means of a bridge 31. The two ends of the V-shaped leaf spring 30 may each be provided with a rubber finger or tip 32 which will press against the back of the license plate 22 to hold it in position when it has been properly inserted.

As will be observed, the front wall or frame 20, side, top and bottom, 12, 13 and 14 are secured to each other and to the back 11 by means of countersunk screws 33 passing through the back 11, through the side 12, top 13 and bottom 14 to the frame 20. One of these countersunk screws forms a hinge 17 for the closure or locking bar 16. A flange 34 on the closure 16 is recessed as at 35 to receive the end of a locking screw 36 which is threaded through the back 11, as clearly brought out in Figure 3. To insure against unauthorized removal of the license plate 22, the set screw 36 cannot be operated by an ordinary screw driver, but is internally splined as at 37 to cooperate with the splined end 38 of a screw driver key 39. It is obvious that by varying the position and the number of the spline 37 and cooperating splined end 38 of the key 39, a number of different individual locks may be provided for different license holders.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. As an article of manufacture, a license plate holder comprising a substantially rectangular frame structure providing channels along three frame members thereof adapted to receive the edge portions of the license plate and having an open slot provided by the remaining frame member thereof, a closure member adapted to be locked in said slot to obstruct passing therethrough when said plate is mounted in said frame structure, a back member provided by the frame structure and extending behind the rear of said plate when said plate is mounted in said frame structure, license plate holding spring means secured on said back member and adapted to hold said license plate firmly in said channel, hinging means securing one end of said closure member in said closure slot, and locking means for removably securing the other end of said closure member at the other end of said slot, said locking means comprising a depending flange on said free end of said closure means adapted to extend into said slot when in closed position, said flange having a set screw receiving recess formed therein on the side towards the back of said holder, said holder back having a cooperating threaded opening extending therethrough, and a cooperating aligned set screw adapted to thread through said threaded opening of said back into said recess of said depending flange to hold said closure member in locked position.

2. As an article of manufacture, a license plate holder comprising a substantially rectangular frame structure providing channels along three frame members thereof adapted to receive the edge portions of the license plate and having an open slot provided by the remaining frame member thereof, a closure member adapted to be locked in said slot to obstruct passing therethrough when said plate is mounted in said frame structure, a back member provided by the frame structure and extending behind the rear of said plate when said plate is mounted in said frame structure, license plate holding spring means secured on said back member and adapted to hold said license plate firmly in said channel, hinging means securing one end of said closure member in said closure slot, and locking means for removably securing the other end of said closure member at the other end of said slot, said locking means comprising a depending flange on said free end of said closure means adapted to extend into said slot when in closed position, said flange having a set screw receiving recess formed therein on the side towards the back of said holder, said holder back having a cooperating threaded opening extending therethrough, a cooperating aligned set screw adapted to thread through said threaded opening of said back into said recess of said depending flange to hold said closure member in locked position, said set screw being provided with a particular spline adapted to cooperate with a particular spline screw driver.

PATRICK HUDSON.